United States Patent
Tseng et al.

(10) Patent No.: US 7,213,946 B2
(45) Date of Patent: May 8, 2007

(54) BACKLIGHT MODULE OF A DIRECTLY LIGHTING BACKLIGHT DEVICE

(76) Inventors: Wen-Pao Tseng, 235 Chung-Ho, Box 8-24, Taipei (TW); Hsin-Chien Chiang, 235 Chung-Ho, Box 8-24, Taipei (TW)

( * ) Notice: Subject to any disclaimer, the term of this patent is extended or adjusted under 35 U.S.C. 154(b) by 122 days.

(21) Appl. No.: 10/958,875

(22) Filed: Oct. 6, 2004

(65) Prior Publication Data

US 2006/0072311 A1   Apr. 6, 2006

(51) Int. Cl.
*F21V 5/00* (2006.01)
(52) U.S. Cl. .................... 362/330; 362/97; 362/216; 362/260
(58) Field of Classification Search ............ 362/29–30, 362/97, 216, 260, 330; 313/573, 634; 349/61, 349/70
See application file for complete search history.

(56) References Cited

U.S. PATENT DOCUMENTS 5,138,223 A * 8/1992 Osada et al. ............... 313/488
6,191,833 B1 * 2/2001 Hirakata .................... 349/61
6,871,979 B2 * 3/2005 Mai ........................... 362/241
2005/0047174 A1 * 3/2005 Pan et al. ................... 362/561

* cited by examiner

Primary Examiner—Sandra O'Shea
Assistant Examiner—Jason Moon Han

(57) ABSTRACT

A backlight module of a directly lighting backlight device comprises a casing; at least one S shape lamp tube; a reflecting sheet positioned below the lamp tube; a guide plate; the reflecting sheet reflecting light from the lamp tube with a predetermined angle to a guide plate above the lamp tube; the guide plate having the effect of diffusing the light to various angles by the pattern on the guide plate or the diffusion agents; whole reflection being not formed so that light is emitted out from a front surface of the guide plate and thus the guide plate reflects light uniformly; a diffuser receiving the uniform distributed light; the diffuser being above the guide plate; and at least one light enhancing sheet; light diffused by the diffuser will further radiate to the at least one light enhancing sheets.

5 Claims, 4 Drawing Sheets

BACKLIGHT MODULE OF A DIRECTLY LIGHTING BACKLIGHT DEVICE

FIELD OF THE INVENTION

The present invention relates to backlight modules, and particular to a backlight module of a directly lighting backlight device, wherein the backlight module comprises at least one S shape lamp tube; the S shape lamp tube has three straight portions and two bending portions which are connected as an S shape.

BACKGROUND OF THE INVENTION

Backlight modules are important components to LCD (liquid crystal display) panels. Since liquid crystals will not emit light, a backlight module is used to provide sufficient and uniform light to the panel so that images can be displayed normally.

Thereby, backlight modules are important components in determination of the performance of the LCD panels. There are two kinds of the backlight modules being used currently. One has single one light source (currently, the cool cathode fluorescent light is used) which is placed at one lateral side of the modules, and is called as lateral lighting backlight modules. The other has a plurality of light sources which are placed below the panels, and is called as directly lighting backlight devices. In the directly lighting backlight device, most of the cool cathode fluorescent lights have straight lamp tubes.

Referring to FIG. 5, the cool cathode fluorescent lights for the directly lighting backlight devices are illustrated. A plurality of straight lamp tubes are spacedly arranged and are placed below a guide plate. However, the lamp tubes only provide light at two sides, while the other two sides have no light. Thereby, dead portions are generated. As a result a center portion of the liquid crystal panel is lighter, and a periphery portion of the liquid crystal panel is darker. Thereby, the uniformity is not preferred.

Thereby, U shape lamp tubes are developed. With reference to FIG. 6, the U shape lamp tubes are used with straight lamp tubes. A U shape lamp tube is arranged between two straight lamp tubes. The bending portion of the U shape lamp tube provides light to lateral sides. However, there is only one bending portion which provides light to one lateral side. The other lateral side has no light. Thereby, the defect in above prior art can not be resolved completely.

For computer game machines, the above mentioned U shape lamp tubes can not provide sufficient light to players. Moreover, the prior arts still have the following deficiencies.

The time period for arranging the lamp tubes are too long, even U shape lamp tubes are used with the straight lamp tubes, the time required is still long. Thereby, the more the number of backlight modules, the more the number of the connectors for controlling the lamp tubes to light up synchronously and thus the cost is high. Furthermore, the more the number of the lamp tubes, the complication the design of the converter for controlling the voltage and stability of the lamp tubes.

SUMMARY OF THE INVENTION

Accordingly, the primary object of the present invention is to provide a backlight module of a directly lighting backlight device comprising at least one S shape lamp tube; the S shape lamp tube having three straight portions and two bending portions which are connected as an S shape.

To achieve above objects, the present invention provides a backlight module of a directly lighting backlight device which comprises a casing; at least one S shape lamp tube; a reflecting sheet positioned below the lamp tube; a guide plate; the reflecting sheet reflecting light from the lamp tube with a predetermined angle to a guide plate above the lamp tube; the guide plate having the effect of diffusing the light to various angles by the pattern on the guide plate or the diffusion agents; whole reflection being not formed so that light is emitted out from a front surface of the guide plate so that the guide plate reflects light uniformly; a diffuser receiving the uniform distributed light; the diffuser being above the guide plate; and at least one light enhancing sheet; light diffused by the diffuser will further radiate to the at least one light enhancing sheets.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
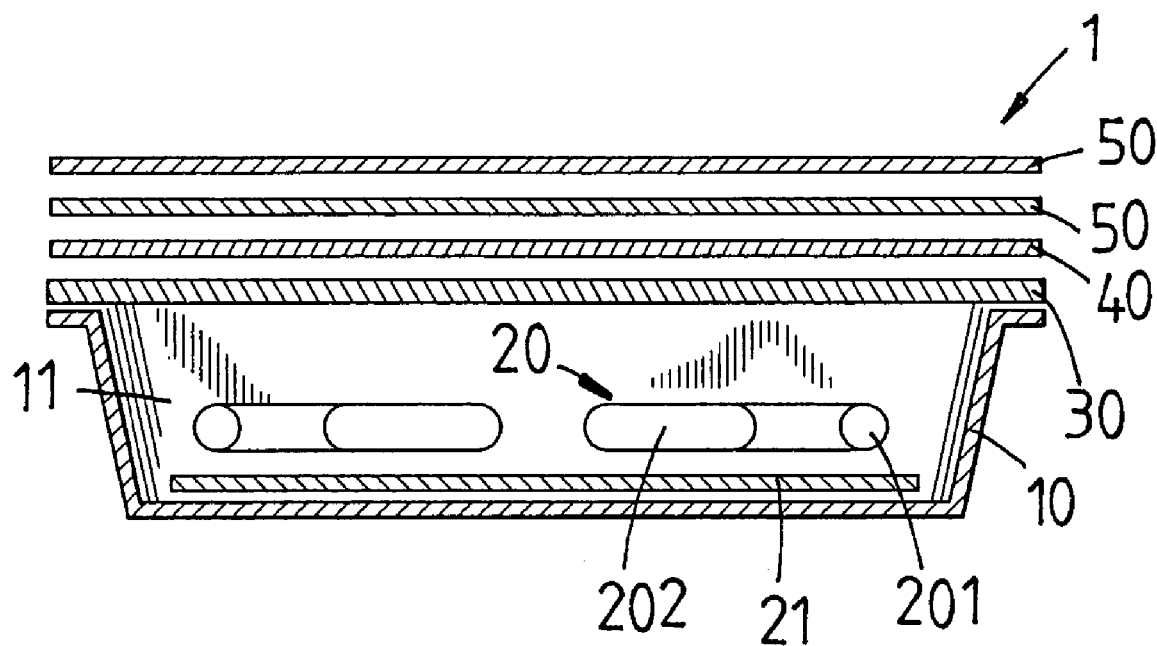
FIG. 1 is a schematic cross view of the present invention.

With reference to FIG. 1, the backlight module of a directly lighting backlight device of the present invention is illustrated. The backlight module 1 of the present invention has the following elements.

A casing 10 (made of metal or plastics) has a receiving space 11 therein. The receiving space 11 serves for receiving at least one S shape lamp tube 20 (which may be one of LEDs, CCFLs, ELDs, CLLs, etc., CLLs are preferable), in the drawing there are two lamp tubes 20 being illustrated. It just shows one example of the present invention, while not to confine the scope of the present invention. A reflecting sheet 21 is positioned below the lamp tube 20 for reflecting light from the lamp tube 20 with a predetermined angle to a guide plate (light guide plate LGP) 30 above the lamp tube 20. The guide plate 30 has the effect of diffusing the light to various angles by the pattern on the guide plate 30 or the diffusion agents. The whole reflection is not formed so that light is emitted out from a front surface of the guide plate 30 and the guide plate 30 reflects light uniformly. Then the uniform distributed light radiates to a diffuser 40 above the guide plate 30. By the auxiliary of the diffuser 40, the distribution of the light will become more uniform. The light diffused by the diffuser 40 will further radiate to at least one light enhancing sheets 50 (or called as prism sheets, generally including a horizontal prism sheet and a vertical prism sheet) for defracting the light to a panel (which is not a main feature of the present invention, and thus the detail will not be further described) for enhancing the illumination of the panel.

Besides, under consideration of other factors, an upper diffuser, or a deflection sheet, or a polarization sheet can be further added above the light enhancing sheets 50 for protecting the light enhancing sheets 50 and increasing the illumination of the panel.

Figure 2:
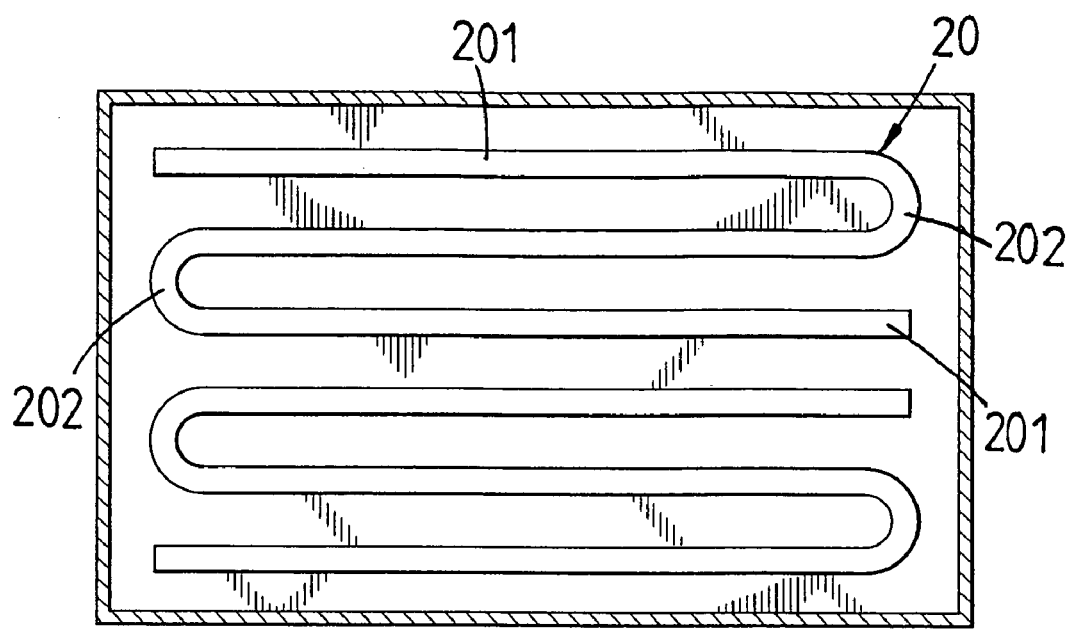
FIG. 2 is a plane schematic view of the S shape lamp tube of the present invention.

The main improvement of the present invention is the design of the lamp tubes 20. With reference to FIG. 2, it is illustrated that each lamp tube 20 of the present invention has three straight portions 201 (line lamp tubes, including an upper portion, a middle portion and a lower portion) and two bending portions 202. The three straight portions 201 and two bending portions 202 are formed as an S shape.

By the bending portions 202 of the S shape lamp tube 20, the illumination of the liquid crystal panel is greatly increased. Thereby, the illumination of the bending portions 202 can be increased so as to increase the illumination in the lateral sides.

Furthermore, the S shape lamp tube 20 has the advantage of simplifying the assembly of the backlight module 1 of the present invention. Furthermore, the user of connector (not shown) can be reduced so as to reduce the cost.

Furthermore, the S shape lamp tube 20 can reduce the amount of the lamp tubes required. Thus it is advantageous for the power adaptor to stabilize and controlling the lamp tubes.

It is advantageous for the S shape design of the present invention. If more straight portions and bending portions are used, from experience, it is apparent that these designs are not better than the S shape design.

Figure 3:
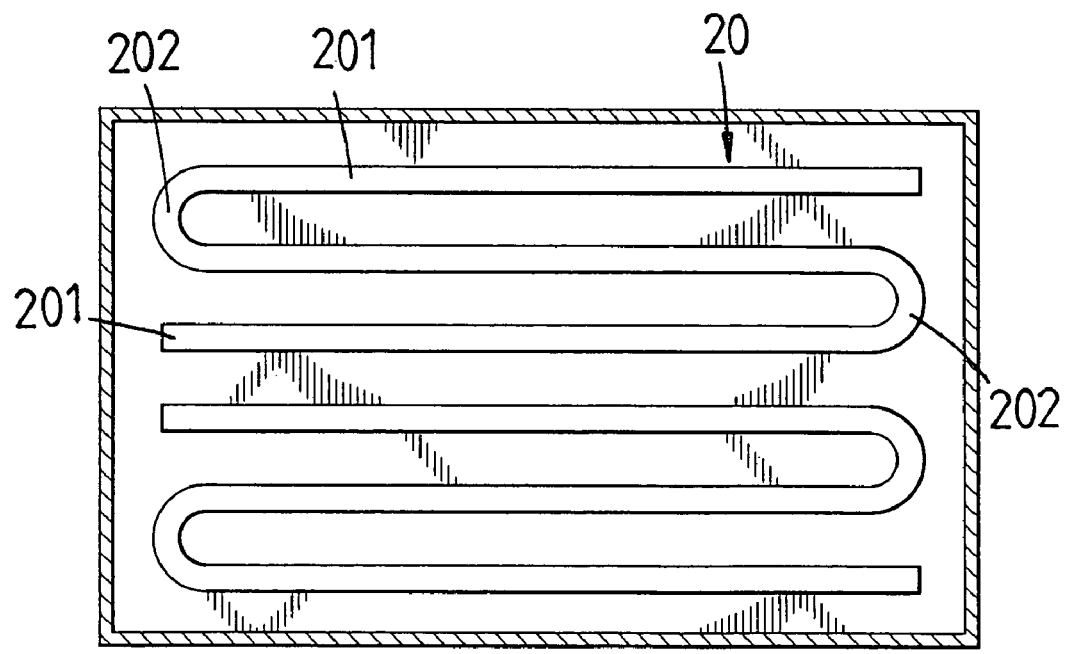
FIGS. 3 and 4 are schematic views showing the arrangement of the S shape lamp tubes in various embodiments.
Figure 4:
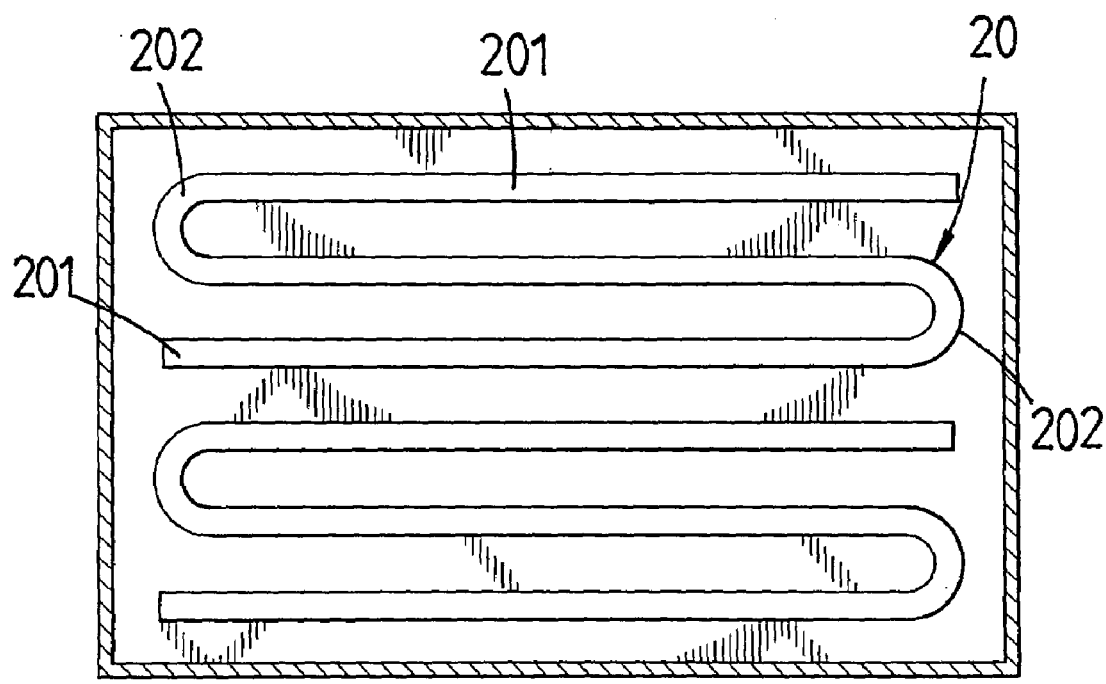
Figure 5:
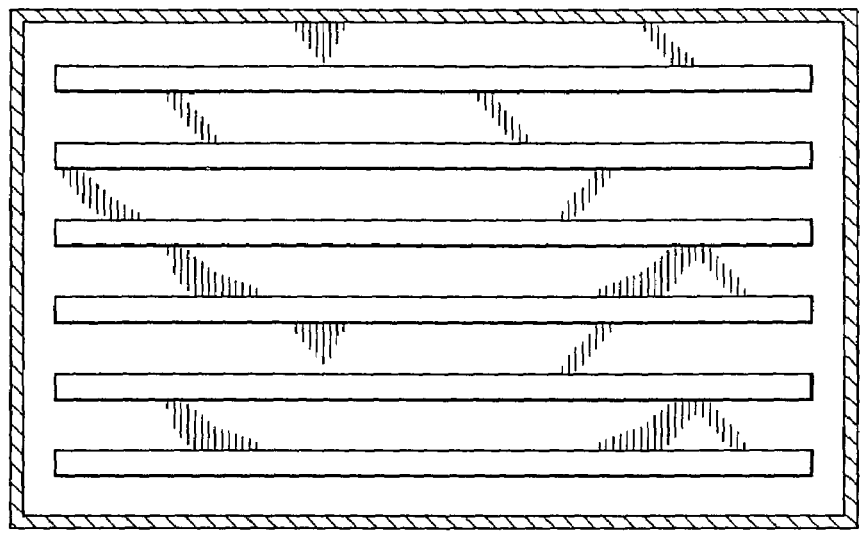
FIG. 5 is a plane schematic view about the prior art straight lamp tubes.
Figure 6:
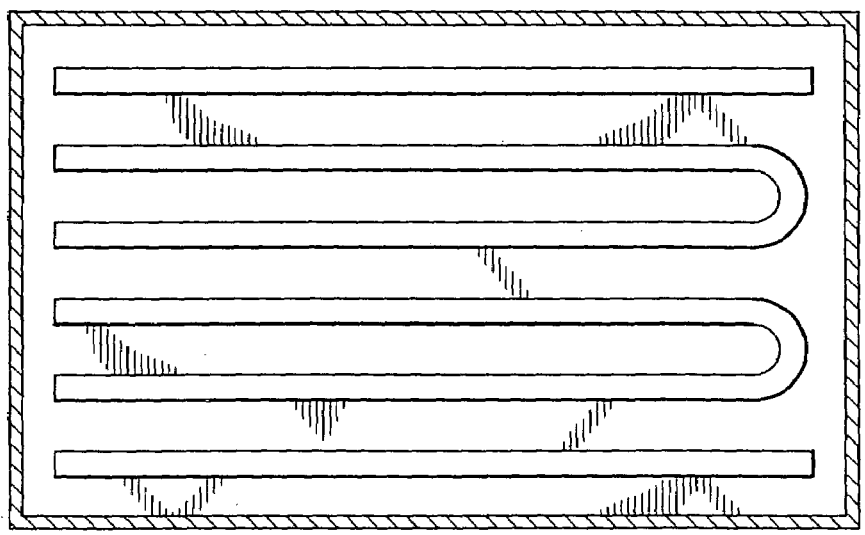
FIG. 6 is a plane schematic view about the prior art U shape lamp tube.

From experiment, it is apparent that two sets of S shape lamp tubes could provide optimum illumination of the backlight module. If more lamp tubes 20 are used, see FIGS. 2, 3 and 4, there are many combinations for the orientations of the S shape lamp tubes. In FIG. 2, a negative S shape lamp tube (at a upper side) and a positive S shape lamp tube (at a lower side) are arranged. In FIG. 3, a positive S shape lamp tube and a negative S shape lamp tube are used. In FIG. 4, two negative S shape lamp tubes are used. All these are within the scope of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A backlight module of a directly lighting backlight device comprising:
    a casing;
    at least one S shape lamp tube;
    a single flat reflecting sheet positioned below the lamp tube;
    a guide plate; the reflecting sheet reflecting light from the lamp tube with a predetermined angle to the guide plate above the lamp tube; the guide plate having the effect of diffusing the light to various angles by a pattern on the guide plate or diffusion agents in a diffuser; whole reflection being not formed so that light emits out from a front surface of the guide plate so that the guide plate reflects light uniformly;
    the diffuser receiving the uniform distributed light; the diffuser being above the guide plate; by using the diffuser, the distribution of the light will become more uniform; and
    at least one light enhancing sheet; light diffused by the diffuser will further radiate to the at least one light enhancing sheet for defracting the light to a liquid crystal panel;
    wherein each S shape lamp tube has three approximate parallel tubes and two cambered tubes; each cambered tube having no straight section; each cambered tube serves to connect two adjacent approximate parallel tubes;
    wherein an upper end of the light enhancing sheet is further added with a diffuser or a reflecting polarizing sheet; and
    wherein there are two light enhancing sheets, one is a horizontal prism sheet and the other is a vertical prism sheet.

2. The backlight module of a directly lighting backlight device as claimed in claim 1, wherein the casing is made of metal.

3. The backlight module of a directly lighting backlight device as claimed in claim 1, wherein the casing is made of plastics.

4. The backlight module of a directly lighting backlight device as claimed in claim 1, wherein the S shape lamp tube is a cool cathode fluorescent light tube.

5. The backlight module of a directly lighting backlight device as claimed in claim 1, wherein the S shape lamp tube having three straight portions and two bending portions which are connected as an S shape.

* * * * *